Jan. 23, 1951     L. POLLOCK     2,539,324
LENS ALIGNER
Filed May 27, 1947
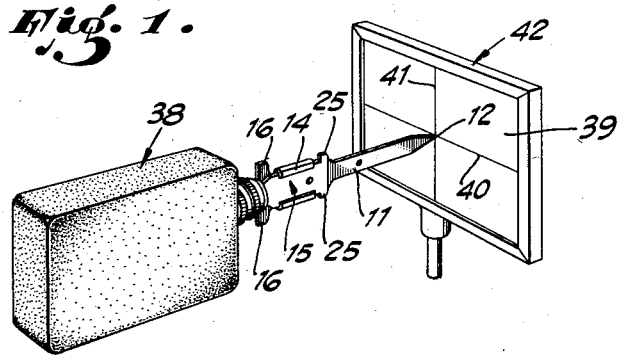
Fig. 1.
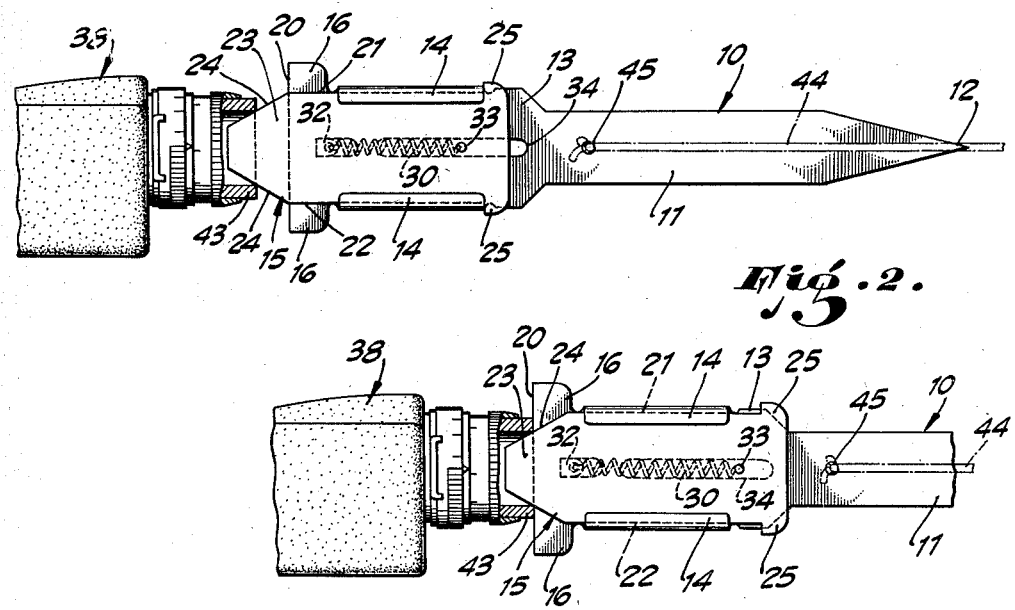
Fig. 2.
Fig. 3.
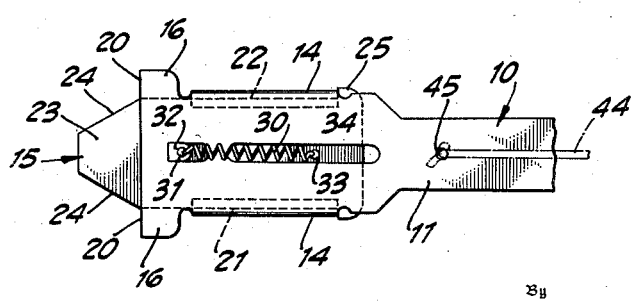
Fig. 4.
Latham Pollock
Inventor
By Forrest J. Lilly
Attorney Patented Jan. 23, 1951

2,539,324

UNITED STATES PATENT OFFICE 2,539,324

LENS ALIGNER

Latham Pollock, Los Angeles, Calif., assignor to Century Engineering Company, Los Angeles, Calif., a partnership composed of Eldon M. Wilson and Latham Pollock Application May 27, 1947, Serial No. 750,785

4 Claims. (Cl. 95—1)

This invention relates in general to photographic equipment, and more specifically to a device for aligning the lens of a camera with an object to be photographed. The device of the invention is particularly useful in photographing objects at extremely close range, as in copy work, macrophotography, or when making titles with a motion picture camera. In work of this nature, the view finder of the camera is of little value due to the fact that it is displaced horizontally and/or vertically from the axis of the objective lens, and the center of the field seen through the view finder is therefore correspondingly displaced from the center of the field of the lens. At close range, this displacement of the view finder and lens fields, or parallax, is quite large in proportion to the dimensions of the field covered, and results in appreciable errors in alignment even when the most careful efforts are made to compensate for it. Such errors are particularly objectionable when making titles for motion picture films, since an off-center misalignment of as little as one-sixteenth of an inch in illustrated or bordered titles is noticeable in projection, and detracts greatly from the appearance and effect of the title.

Prior devices for aligning the camera lens with the center of the title card have been based, for the most part, on the use of special centering cards or other means for compensating for parallax, but these have been unsatisfactory because they depend upon accurate sighting through the view finder, and the view finder itself has an appreciable amount of parallax when the eye is shifted slightly to one side or another of the optical axis. As a result, the accuracy of these devices leaves much to be desired.

One of the primary objects of the invention, therefore, it to provide a lens aligning device which is entirely independent of the view finder and which is positive in its action and extremely accurate.

Another object is to provide a lens aligning device which is simple to use, inexpensive to manufacture, and adapted for use with lenses of all makes and models.

Briefly stated, the invention consists of a pointer having a transverse edge portion at its rear end, and a movable wedge-shaped member associated therewith. The wedge portion is inserted into the end of the lens barrel to center the pointer with respect to the lens, and the transverse edge portion is then brought back to bear against the end of the barrel to align the axis of the pointer parallel to the axis of the lens. The pointer is made to such a length that the point thereof extends almost to the titler platen. A centering card having crossed centerlines is preferably inserted into the platen first, and the platen can then be adjusted until the point falls directly on the center. After the adjustment has been made for the vertical plane, the pointer is turned 90° and the process repeated to secure alignment in a horizontal plane.

The foregoing and other objects and advantages of the invention will become apparent to those skilled in the art upon consideration of the following detailed description of the preferred embodiments thereof, reference being had to the drawings, in which:

Figure 1 is a perspective view of a motion picture camera and titler platen, showing the manner in which the device of the invention is used to center a title card on the axis of the lens;

Figure 2 is an elevational view of the device, showing the wedge-shaped portion of the movable member inserted into the lens barrel of the camera to center the pointer on the axis of the lens;

Figure 3 is another view of the same, showing the transverse edge portion at the rear end of the pointer brought back to bear against the end of the lens barrel to align the axis of the pointer parallel to the axis of the lens; and Figure 4 is a fragmentary view of the pointer as seen from the other side.

In the drawings, the reference numeral 10 designates the lens aligning device in its entirety, said device comprising a flat metal pointer 11 which tapers at its front end to a sharp point 12 lying on the axis of the pointer. The rear end portion 13 of the pointer is made somewhat wider than the front end portion, and flanges 14 are turned over along the top and bottom edges of the portion 13 to form guide channels for a sliding member 15. Projecting laterally from opposite sides of the pointer 11 at the rear end thereof are shoulder portions 16 which terminate at their rear ends in a transverse edge 20 disposed perpendicular to the axis of the pointer.

The sliding member 15 is in the nature of a plate, having parallel edges 21 and 22 which are received within the channels formed by flanges 14 on the pointer. At its rear end, the member 15 is formed with a wedge portion 23, the rearwardly converging edges 24 of which are disposed symmetrically on either side of the pointer axis. Lateral projections 25 at the front end of the member 15 engage the front ends of the flanges 14 to limit movement of the member 15 toward the left.

The member 15 is yieldingly biased toward the left by means of a spring 30, one end of which is hooked through a hole 31 in an ear 32 struck out from the body of the pointer on the back side thereof, and the other end of said spring is hooked through a hole 33 in the member 15. A longitudinally extending slot 34 is provided in the body of the pointer to permit the end of the spring 30 to pass through to the member 15.

The manner of using the device with a motion picture camera 38 in making titles is illustrated in Figure 1. A centering card 39 having crossed centerlines 40 and 41 is inserted into the titler platen 42 and, with the device held in vertical position, the wedge 23 of the sliding member 15 is inserted into the lens barrel 43 to center the pointer with respect thereto. The pointer 11 is then pulled back against the tension of spring 30 until the transverse edge 20 bears against the end of the lens barrel 43, as shown in Figure 3. The engagement of the edge 20 with both sides of the lens barrel 43 causes the axis of the pointer to be aligned parallel with the axis of the lens. The point 12 at the front end of the pointer now lies in the horizontal plane drawn through the axis of the lens, and the platen 42 or camera 38 is adjusted up or down until the horizontal centerline 40 lies directly at the point 12. The device is then turned to a horizontal position and the edge 20 is again brought back to bear on the end of the lens barrel. The platen 42 or camera 38 is now adjusted horizontally until the vertical centerline 41 lies directly at the point 12. The platen 42 is now exactly centered with respect to the centerline of the lens, and the centering card 39 is removed and replaced by the title card.

Provision is made for extending the axis of the pointer 11 in the event that the object to be photographed is located at a greater distance from the camera lens than the length of the pointer. To this end, means is provided for attaching a cord 44 to the pointer on the axis thereof, said means comprising a hole 45 through which the cord 44 is passed and then knotted. The hole 45 is located at about the midpoint of the pointer 11, and when the cord is stretched out to the object to be photographed, the latter will be aligned with the axis of the lens when point 12 and cord 45 coincide.

While I have shown and described in considerable detail what I believe to be the preferred form of my invention, it is to be understood that such details are not restrictive, and the invention may take various other forms without departing from the scope of the broader claims appended hereto.

I claim:

1. A device for aligning the lens of a camera with the center of an object to be photographed, said device comprising a member having a point at one end thereof, and another member associated with said first named member and movable axially with respect thereto, one of said members having rearwardly converging edge portions at the rear end thereof engageable with a cylindrical surface of the lens barrel to center the device with respect to the lens, and the other of said members having laterally extending edge portions perpendicular to the axis of the said device and engageable with the end of said barrel to align the axis of the pointer with a plane taken through the axis of said lens.

2. A device for aligning the lens of a camera with the center of an object to be photographed, said device comprising a pointer having a transverse edge portion at the rear end thereof engageable with the end of the lens barrel to align the axis of the pointer parallel to a plane taken through the axis of the lens, and a member movable with respect to said pointer and biased in the direction of the lens, said member having a wedge portion at its rear end engageable with the inside surface of said barrel to center the pointer with respect to said lens.

3. A device for aligning the lens of a camera with the center of an object to be photographed, said device comprising a pointer having a rear edge disposed perpendicular to the axis thereof, said edge being engageable with the end of the lens barrel to align the axis of the pointer parallel to a plane taken through the axis of the lens, a member slidable axially with respect to said pointer, and spring means connected to said pointer and to said member for urging the latter in the direction of said lens, said member having a wedge portion at the rear end thereof engageable with the inside surface of said barrel to center the pointer with respect to the lens.

4. A device for aligning the lens of a camera with the center of an object to be photographed, said device comprising a pointer having means at the rear end thereof engageable with the rim of the lens barrel to align the axis of said pointer with a plane taken through the axis of said lens, and means for attaching one end of a cord to said pointer on the axis thereof, whereby said cord, when aligned with the point of said pointer, provides an extension of the axis of the pointer to an object located at a distance greater than the length of the pointer.

LATHAM POLLOCK.

REFERENCES CITED

The following references are of record in the file of this patent:

UNITED STATES PATENTS

| Number | Name | Date |
|---|---|---|
| 1,109,625 | Cooper | Sept. 1, 1914 |

FOREIGN PATENTS

| Number | Country | Date |
|---|---|---|
| 270,769 | Italy | Jan. 20, 1930 |